United States Patent
Ahonen et al.

(10) Patent No.: US 10,951,950 B2
(45) Date of Patent: Mar. 16, 2021

(54) METHOD AND APPARATUS FOR PRESENTING A VIDEO LOOP DURING A STORYLINE

(71) Applicant: Nokia Technologies Oy, Espoo (FI)

(72) Inventors: Timo Juhani Ahonen, Redwood City, CA (US); Daniel Andre Vaquero, Sunnyvale, CA (US); Miska Matias Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/664,929

(22) Filed: Jul. 31, 2017

(65) Prior Publication Data

US 2019/0037278 A1    Jan. 31, 2019

(51) Int. Cl.
*H04N 21/472*    (2011.01)
*G06F 3/01*    (2006.01)
(Continued)

(52) U.S. Cl.
CPC ....... *H04N 21/47217* (2013.01); *G06F 3/011* (2013.01); *G06F 3/013* (2013.01); *G06F 3/0484* (2013.01); *H04N 21/2387* (2013.01); *H04N 21/42653* (2013.01); *H04N 21/4318* (2013.01); *H04N 21/4333* (2013.01); *H04N 21/44* (2013.01); *H04N 21/44012* (2013.01);
(Continued)

(58) Field of Classification Search
None
See application file for complete search history.

(56) References Cited

U.S. PATENT DOCUMENTS

| | | | | |
|---|---|---|---|---|
| 5,847,703 A | * | 12/1998 | Teicher | G11B 27/11 725/56 |
| 6,574,422 B1 | * | 6/2003 | Kikuchi | G11B 19/04 386/248 |

(Continued)

FOREIGN PATENT DOCUMENTS

WO    WO 2015/167441 A1    11/2015

OTHER PUBLICATIONS

In re: Timo Juhani Ahonen; U.S. Application titled *Method and Apparatus for Encoding or Decoding Video Content Including Regions Having Looping Videos of Different Loop Lengths*; U.S. Appl. No. 15/664,847, filed Jul. 31, 2017, 41 pages.

(Continued)

*Primary Examiner* — Ricky Chin
(74) *Attorney, Agent, or Firm* — Alston & Bird LLP

(57) ABSTRACT

A method, apparatus and computer program product facilitate the viewing of a storyline defined in a video. In regards to a method, viewing by a user of different sequential areas of a video over time is monitored. The different sequential areas of the video over time define a storyline. If the storyline is followed, the video continues to be presented. However, if the storyline is not followed in that a next sequential area of the video is not viewed, a portion of the video prior to the next sequential area is caused to be repeatedly replayed in a loop. Following this repeated replay of the portion of the video, the repeated replay of the portion of the video is ceased and the presentation of the video is resumed if the storyline is followed and the next sequential area of the video in the storyline is viewed.

18 Claims, 5 Drawing Sheets

(51) Int. Cl.
    *H04N 21/442* (2011.01)
    *H04N 21/44* (2011.01)
    *H04N 21/81* (2011.01)
    *H04N 21/426* (2011.01)
    *H04N 21/2387* (2011.01)
    *H04N 21/431* (2011.01)
    *H04N 21/433* (2011.01)
    *G06F 3/0484* (2013.01)

(52) U.S. Cl.
    CPC ........... *H04N 21/44016* (2013.01); *H04N 21/44218* (2013.01); *H04N 21/44222* (2013.01); *H04N 21/47205* (2013.01); *H04N 21/8146* (2013.01); *H04N 21/8153* (2013.01)

(56) References Cited

U.S. PATENT DOCUMENTS

| | | | |
|---|---|---|---|
| 8,640,166 B1 * | 1/2014 | Craner | H04N 21/4826 725/37 |
| 9,363,569 B1 * | 6/2016 | van Hoff | G06Q 30/0263 |
| 9,392,212 B1 | 7/2016 | Ross | |
| 9,395,811 B2 | 7/2016 | Vaught et al. | |
| 9,478,143 B1 * | 10/2016 | Bowen | G09B 5/06 |
| 9,916,077 B1 * | 3/2018 | Lewis | G06F 3/0487 |
| 2001/0033343 A1 * | 10/2001 | Yap | G11B 27/034 348/734 |
| 2002/0190991 A1 * | 12/2002 | Efran | H04N 5/2224 345/475 |
| 2003/0028107 A1 * | 2/2003 | Miller | A61B 5/6819 600/437 |
| 2005/0278774 A1 * | 12/2005 | Eshleman | H04N 5/775 725/153 |
| 2008/0282295 A1 * | 11/2008 | Gabriel | H04N 21/235 725/62 |
| 2008/0310819 A1 * | 12/2008 | Akiyama | G11B 20/00086 386/252 |
| 2009/0037962 A1 * | 2/2009 | Benco | H04N 7/17318 725/88 |
| 2010/0066841 A1 * | 3/2010 | Quail | H04N 7/147 348/207.11 |
| 2012/0304225 A1 * | 11/2012 | Ritter | H04N 21/25866 725/35 |
| 2014/0013361 A1 * | 1/2014 | Monari | H04N 5/2252 725/62 |
| 2014/0168243 A1 * | 6/2014 | Huang | G06T 1/20 345/522 |
| 2014/0196063 A1 * | 7/2014 | Schorter | H04N 21/4147 725/5 |
| 2014/0344730 A1 * | 11/2014 | Yoshiaki | H04N 21/4147 715/764 |
| 2015/0036999 A1 * | 2/2015 | Batur | G06F 3/013 386/230 |
| 2015/0264425 A1 * | 9/2015 | Heinz, II | H04N 21/4318 386/223 |
| 2015/0296195 A1 * | 10/2015 | Greene | H04N 5/765 386/248 |
| 2015/0356195 A1 * | 12/2015 | Kilzer | G06F 40/14 715/234 |
| 2016/0026344 A1 * | 1/2016 | Elmieh | G06F 3/0482 715/716 |
| 2016/0234268 A1 * | 8/2016 | Ouyang | H04L 65/4069 |
| 2016/0328015 A1 * | 11/2016 | Ha | G06F 1/163 |
| 2017/0060601 A1 * | 3/2017 | Joshi | G11B 27/036 |
| 2017/0116459 A1 | 4/2017 | Chen et al. | |
| 2017/0127011 A1 * | 5/2017 | Okajima | G09G 5/14 |
| 2017/0251538 A1 * | 8/2017 | Green | H05B 37/029 |
| 2017/0330228 A1 * | 11/2017 | Kim | A63F 13/335 |
| 2017/0359613 A1 * | 12/2017 | Hedhli | H04N 21/47202 |
| 2018/0010123 A1 | 1/2018 | Stuelpnagel et al. | |
| 2018/0012408 A1 * | 1/2018 | Gentilin | H04L 67/141 |
| 2018/0056190 A1 * | 3/2018 | Ahn | A63F 13/61 |
| 2018/0067641 A1 * | 3/2018 | Lerner | H04N 21/42203 |
| 2018/0098101 A1 * | 4/2018 | Pont | H04N 21/2187 |
| 2018/0101238 A1 * | 4/2018 | Thomas-Brigden | H04N 21/482 |
| 2018/0130097 A1 * | 5/2018 | Tran | G06Q 30/0267 |
| 2018/0174619 A1 * | 6/2018 | Roy | G11B 27/102 |
| 2018/0192146 A1 * | 7/2018 | Lian | H04N 13/117 |
| 2018/0369637 A1 * | 12/2018 | Hoang | A63B 24/0003 |
| 2019/0037278 A1 * | 1/2019 | Ahonen | H04N 21/47217 |

OTHER PUBLICATIONS

Medium—User Aware Video Window [online] [retrieved May 10, 2017]. Retrieved from the Internet: <URL: https://medium.com/@kevalpate12106/user-aware-video-view-4172c9f722e2>. (dated Oct. 31, 2016) 6 pages.

New Publisher Tools for 360 Video [online] [retrieved Aug. 24, 2017]. Retrieved from the Internet: <URL: https://media.fb.com/2016/08/10/new-publisher-tools-for-360-video/>. 4 pages.

* cited by examiner

METHOD AND APPARATUS FOR PRESENTING A VIDEO LOOP DURING A STORYLINE

TECHNOLOGICAL FIELD

An example embodiment relates generally to the presentation of a video in which a storyline is defined and, more particularly, to the presentation of a video loop in an instance in which the viewer fails to follow the storyline in order to encourage the viewer to resume following of the storyline.

BACKGROUND

Video, such as large field of view video, may be viewed for a variety of purposes including, for example, in conjunction with virtual reality applications. As a result of the large field of view which may extend beyond the portion of the video presented at any one point in time by a display device, a viewer may find it challenging to fully explore the scene and to identify the portions of the video upon which to focus. As such, a viewer may miss portions of the video that are generally considered more interesting or more significant for any of various reasons.

As such, storylines have been developed. A storyline defines a sequence of spatial locations within a video over time, which are recommended to the viewer. Thus, a storyline may include a first location at a first time, a second location at a second time and so on. The sequence of spatial locations generally includes those portions of the video over time that are considered more interesting or more significant. Storylines may be crafted by the creator of the video content or by someone else involved in the creation and/or editing of the video. Upon playing of the video, suggestions may be provided to the viewer of the different spatial locations over time that would be interesting for the viewer to watch.

The suggestions may be provided to the viewer regarding the sequence of spatial locations that define the storyline in various manners. For example, the video may be automatically panned to each spatial location in sequence to ensure that the viewer watches the portions of the video that comprise the storyline. In conjunction with a virtual reality application, the automatic panning of the video does not require the viewer to move around the scene, such as by turning their head or re-orientating their gaze. Instead, the scene is automatically moved so that each spatial location of the storyline is, in turn, placed in the field of view of the viewer. However, this automatic panning to the different spatial locations over time reduces the freedom that a viewer otherwise enjoys to explore the scene and to repeatedly view areas of the scene that are of particular interest.

Another technique for encouraging a viewer to follow a storyline includes the display of arrows or other directions upon the video that provide an indication to the viewer as to the direction in which their attention should be relocated in order to view the next spatial location of the video in the storyline. The inclusion of arrows or other directions in the video, however, may detract from the viewer's enjoyment of and immersion into the scene and may be considered intrusive.

BRIEF SUMMARY

A method, apparatus and computer program product are provided in accordance with an example embodiment in order to facilitate the viewing of a storyline defined in a video, such as a video having a large field of view including, for example, a video viewed in conjunction with a virtual reality application. In this regard, the method, apparatus and computer program product of an example embodiment cause a portion of the video to be repeated in an instance in which the storyline is not followed. By repeating the portion of the video, the viewer may recognize that they are no longer following the storyline and the viewer may then resume following of the storyline in order to view, for example, the most significant portions of the video. By causing the portion of the video to be repeated in an instance in which the storyline is not followed, the viewer may be alerted in a manner that is not as intrusive and that still permits the user to have freedom to explore portions of the video outside of the storyline and/or to repeat their viewing of portions of the video that are of particular interest.

In an example embodiment, a method is provided that includes monitoring viewing by a user of different sequential areas of a video over time. The different sequential areas of the video over time define a storyline. In an instance in which the storyline is followed, the method permits the video to continue to be presented. However, in an instance in which the storyline is not followed in that a next sequential area of the video in the storyline is determined not to be viewed, the method causes a portion of the video prior to the next sequential area to be repeatedly replayed in a loop. Following this repeated replay of the portion of the video, the method causes the repeated replay of the portion of the video to cease and the presentation of the video to resume in an instance in which the storyline is followed and the next sequential area of the video in the storyline is determined to be viewed.

The method of an example embodiment also includes determining, in the instance in which the storyline is not followed, whether the portion of the video prior to the next sequential area is static. In an instance in which the portion of the video prior to the next sequential area is static, the method of this example embodiment also includes causing a frame of the video prior to the next sequential area to be repeatedly presented. In this example embodiment, the method alternatively causes the portion of the video prior to the next sequential area to be repeatedly replayed in a loop to only be performed in an instance in which the portion of the video prior to the next sequential area is not static but varies over time.

The method of an example embodiment causes the portion of a video prior to the next sequential area to be repeatedly replayed in a loop by defining a length of the portion of the video that is repeatedly replayed in the loop based upon a predefined loop period. In this example embodiment, the storyline defines a respective transition point associated with each sequential area and the portion of the video that is repeatedly replayed in the loop includes the portion of the video that immediately precedes the transition point and that has the defined length. The method of an example embodiment causes the portion of the video prior to the next sequential area to be repeatedly replayed in a loop until the storyline is followed and the next sequential area of the video in the storyline is determined to be viewed. In an example embodiment, the video has a field of view that extends beyond a display device upon which the video is presented.

In another example embodiment, an apparatus is provided that includes at least one processor and at least one memory including computer program code with the at least one memory and the computer program code configured to, with the processor, cause the apparatus to at least monitor viewing by a user of different sequential areas of a video over time. The different sequential areas of the video over time define a storyline. In an instance in which the storyline is followed, the at least one memory and the computer program code are configured to, with the processor, cause the apparatus to permit the video to continue to be presented. In an instance in which the storyline is not followed in that a next sequential area of the video in the storyline is determined not be viewed, the at least one memory and the computer program code are configured to, with the processor, cause the apparatus to cause a portion of the video prior to the next sequential area to be repeatedly replayed in a loop. Following repeated replay of the portion of the video, the at least one memory and the computer program code are configured to, with the processor, cause the apparatus to cause the repeated replay of the portion of the video to cease and presentation of the video to resume in an instance in which the storyline is followed and the sequential area of the video in the storyline is determined to be viewed.

The at least one memory and computer program code are further configured to, with the processor, cause the apparatus of an example embodiment to determine, in the instance in which the storyline is not followed, whether the portion of the video prior to the next sequential area is static. In an instance in which the portion of the video prior to the next sequential area is static, the at least one memory and the computer program code are further configured to, with the processor, cause the apparatus of this example embodiment to cause a frame of the video prior to the next sequential area to be repeatedly presented. The at least one memory and the computer program code are also configured to, with the processor, cause the apparatus of this example embodiment to cause the portion of the video prior to the next sequential area to be repeatedly replayed in a loop only in an instance in which the portion of the video prior to the next sequential area is not static but varies over time.

The at least one memory and the computer program code are configured to, with the processor, cause the apparatus of an example embodiment to cause the portion of the video prior to the next sequential area to be repeatedly replayed in a loop based upon a predefined loop length. In this example embodiment, the storyline defines a respective transition point associated with each sequential area. As such, the portion of the video that is repeatedly replayed in the loop includes the portion of the video that immediately precedes the transition point and that has the defined length. The at least one memory and the computer program code are configured to, with the processor, cause the apparatus to cause the portion of the video prior to the next sequential area to be repeatedly replayed in a loop until the storyline is followed and the next sequential area of the video in the storyline is determined to be viewed. In an example embodiment, the video has a field of view that extends beyond a display device upon which the video is presented.

In a further example embodiment, a computer program product is provided that includes a non-transitory computer readable storage medium with the non-transitory computer readable storage medium including instructions that, when executed, are configured to cause monitoring viewing by a viewer of different sequential areas of a video over time. The different sequential areas of the video over time define a storyline. In an instance in which the storyline is followed, the non-transitory computer readable storage medium includes instructions that, when executed, are configured to permit the video to continue to be presented. In an instance in which the storyline is not followed in that a next sequential area of the video in the storyline is determined not to be viewed, the non-transitory computer readable storage medium includes instructions that, when executed, are configured to cause a portion of the video prior to the next sequential area to be repeatedly replayed in a loop. Following the repeated replay of the portion of the video, the non-transitory computer readable storage medium includes instructions that, when executed, are configured to cause the repeated replay of the portion of the video to cease and presentation of the video to resume in an instance in which the storyline is followed and the next sequential area of the video in the storyline is determined to be viewed.

The non-transitory computer readable storage medium of an example embodiment further includes instructions that, when executed, are configured to determine, in the instance in which the storyline is not followed, whether the portion of the video prior to the next sequential area is static and, in an instance in which the portion of the video prior to the next sequential area is static, to cause a frame of the video prior to the next sequential area to be repeatedly presented. In this example embodiment, the instructions that, when executed, are configured to cause the portion of the video prior to the next sequential area to be repeatedly replayed in a loop are only executed in an instance in which the portion of the video prior to the next sequential area is not static but varies over time.

In an example embodiment, the instructions that, when executed, are configured to cause the portion of the video prior to the next sequential area to be repeatedly replayed in a loop include instructions that, when executed, are configured to define a length that the portion of the video that is repeatedly replayed in the loop based upon a predefined loop period. In this example embodiment, the storyline defines a respective transition point associated with each sequential area and the portion of the video that is repeatedly replayed in the loop includes the portion of the video that immediately precedes the transition point and that has the defined length. In an example embodiment, the instructions that, when executed, are configured to cause the portion of the video prior to the sequential area to be repeatedly replayed in a loop include instructions that, when executed, are configured to cause the portion of the video prior to the next sequential area to be repeatedly replayed in a loop until the storyline is followed and the next sequential area of the video in the storyline is determined to be viewed.

In yet another example embodiment, an apparatus is provided that includes means for monitoring viewing by a viewer of different sequential areas of a video over time. In an instance in which the storyline is followed, the apparatus also includes means for permitting the video to continue to be presented. However, in an instance in which the storyline is not followed in that a next sequential area of video in the storyline is determined not to be viewed, the apparatus also includes means for causing a portion of the video prior to the next sequential area to be repeatedly replayed in a loop. Following repeated replay of the portion of the video, the apparatus further includes means for causing the repeated replay of the portion of the video to cease and presentation of the video to resume in an instance in which the storyline is followed and the next sequential area of the video in the storyline is determined to be viewed.

The apparatus of an example embodiment also includes means for determining, in the instance in which the storyline is not followed, whether the portion of the video prior to the next sequential area is static and, in an instance in which the portion of the video prior to the next sequential area is static, means for causing a frame of the video prior to the next sequential area to be repeatedly presented. In this example embodiment, the means for causing the portion of the video prior to the next sequential area to be repeatedly replayed in a loop does so only in an instance in which the portion of the video prior to the next sequential area is not static but varies over time.

In an example embodiment the means for causing the portion of the video prior to the next sequential area to be repeatedly replayed in a loop includes means for defining a length of the portion of the video that is repeatedly replayed in a loop based upon a predefined loop period. In this example embodiment, the storyline defines a respective transition point associated with each sequential area and the portion of the video that is repeatedly replayed in the loop includes the portion of the video that immediately precedes the transition point and that has the defined length. In an example embodiment, the means for causing the portion of the video prior to the next sequential area to be repeatedly replayed in a loop includes means for causing the portion of the video prior to the next sequential area to be repeatedly replayed in the loop until the storyline is followed and the next sequential area of the video in the storyline is determined to be viewed.

BRIEF DESCRIPTION OF THE DRAWINGS

Figure 1:
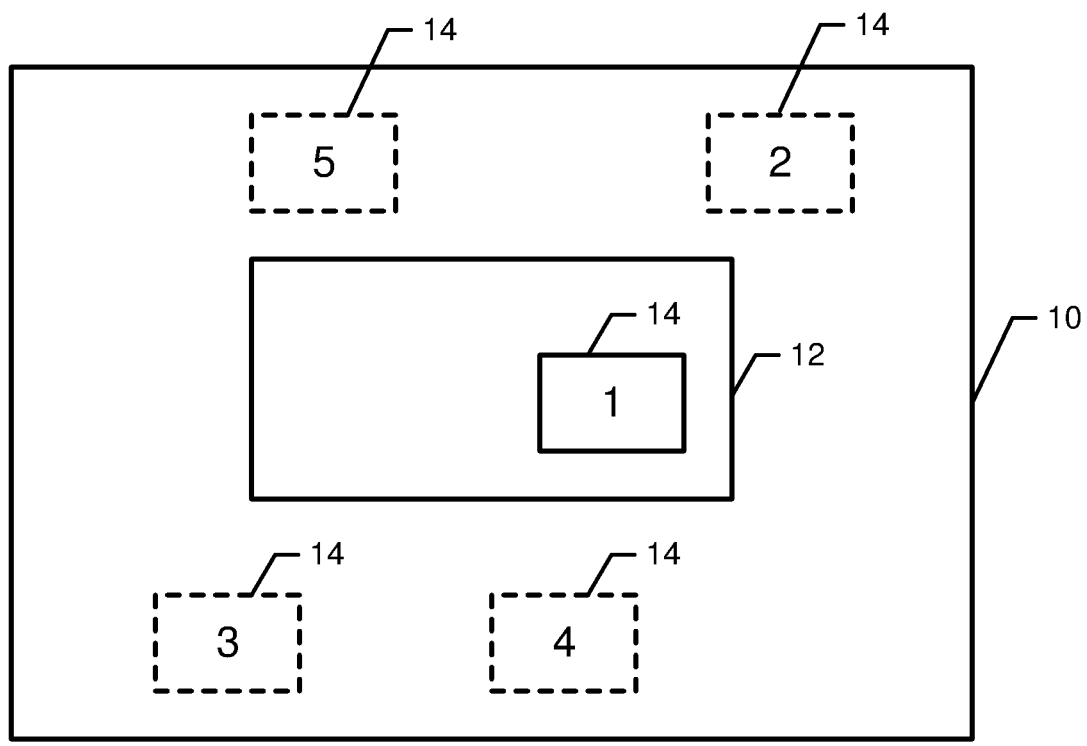
Figure 2:
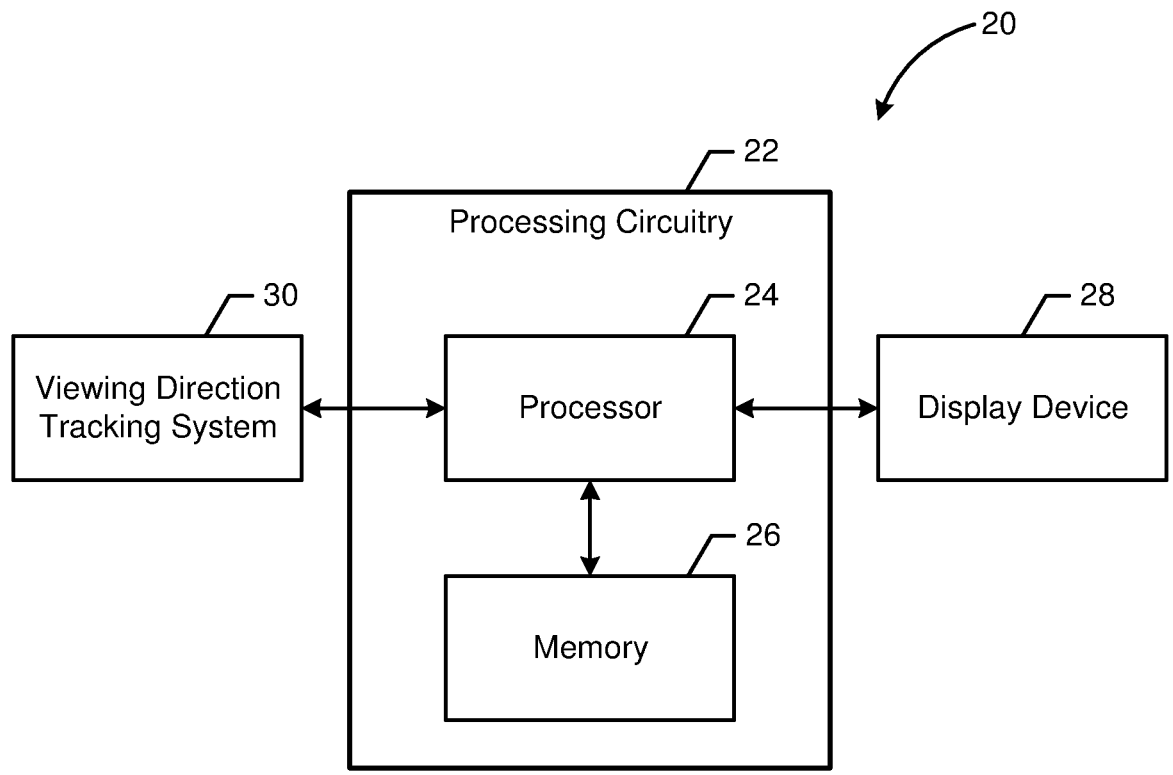
Figure 3:
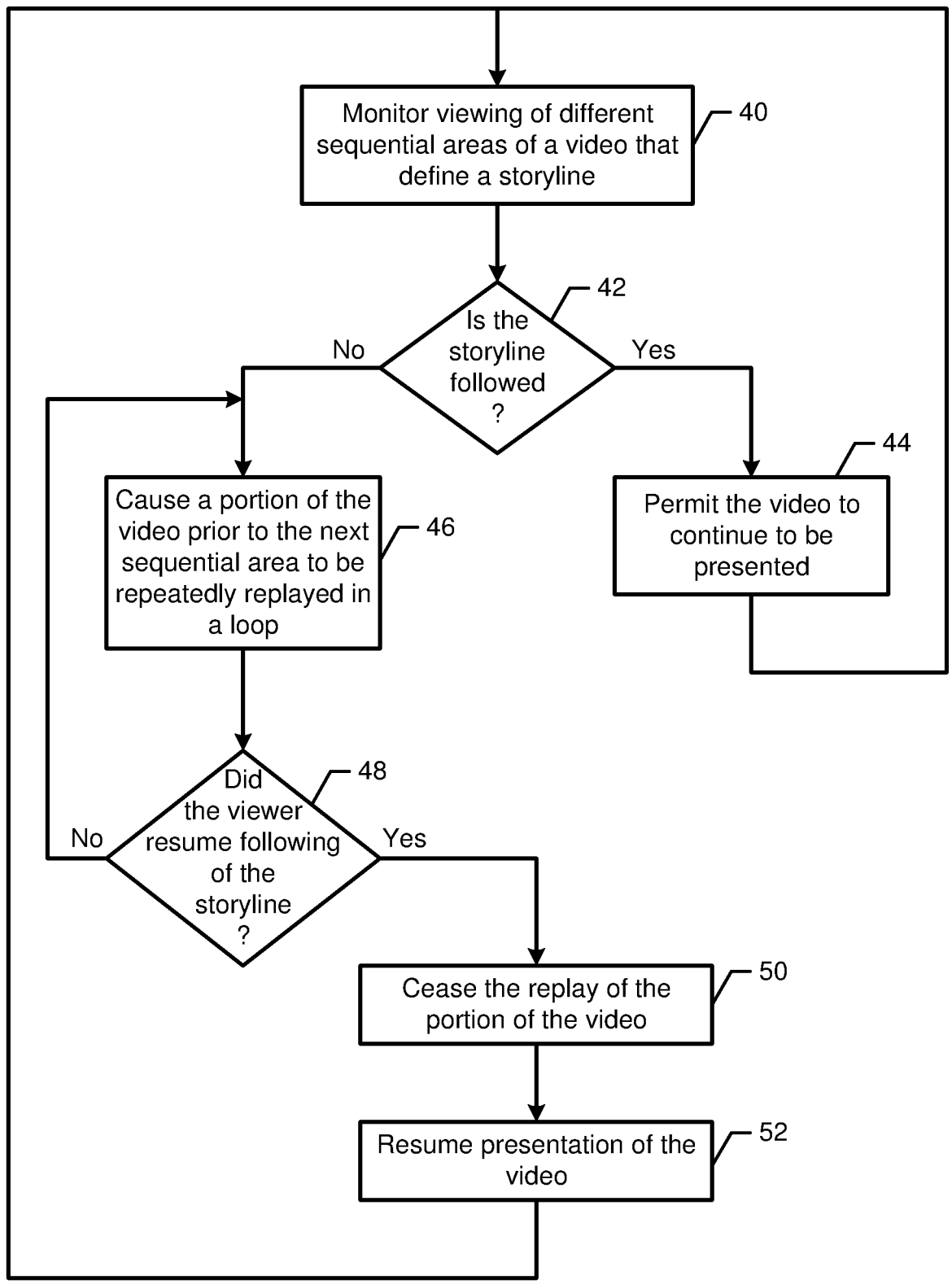
Figure 4A:
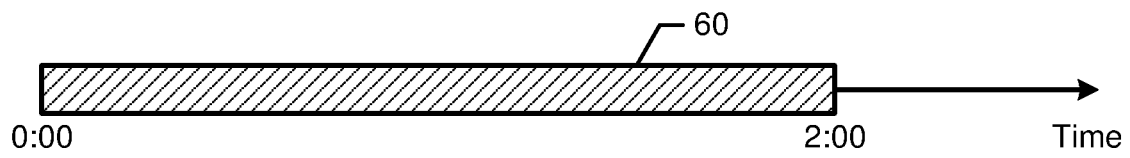
Figure 4B:
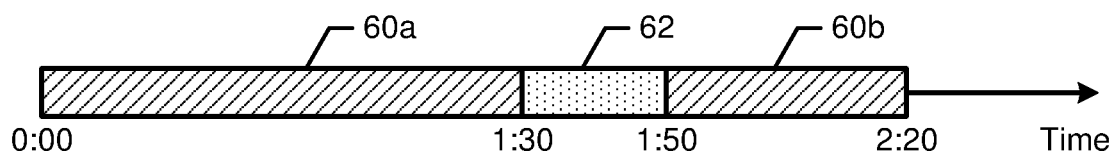
Figure 5:
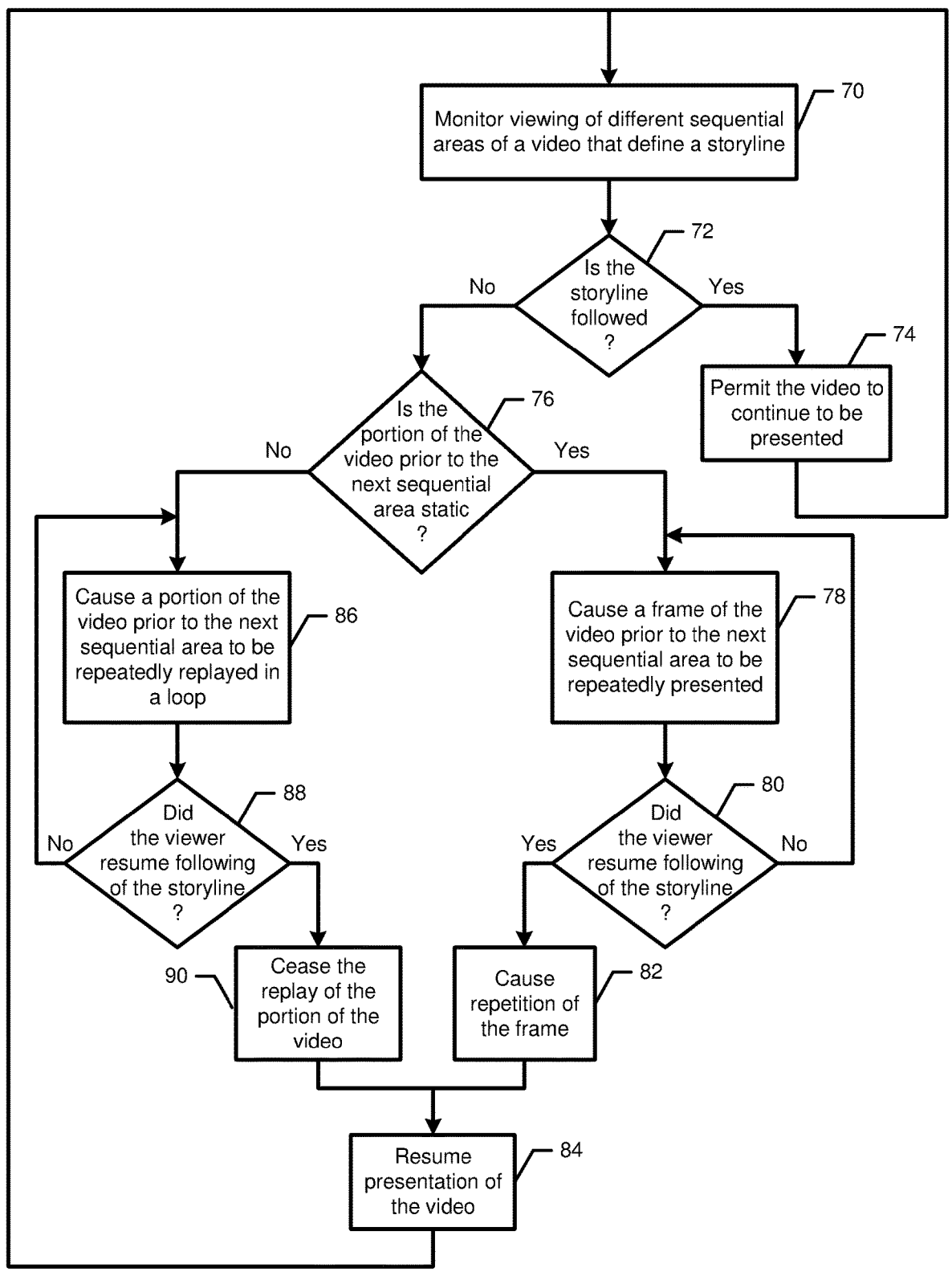

Having thus described certain example embodiments of the present disclosure in general terms, reference will now be made to the accompanying drawings, which are not necessarily drawn to scale, and wherein:

FIG. 1 is a schematic representation of a storyline comprised of different sequential areas of a video over time;

FIG. 2 is a block diagram of an apparatus that may be specifically configured in accordance with an example embodiment of the present disclosure;

FIG. 3 is a flow chart illustrating operations performed, such as by the apparatus of FIG. 2, in accordance with an example embodiment of the present disclosure;

FIG. 4a is a timeline indicating standard playback of a video in an instance in which a viewer follows the storyline;

FIG. 4b is a timeline representing the playback of the same video as in FIG. 4a in which the viewer ceases to follow the storyline and a portion of the video is presented in a loop in accordance with an example embodiment of the present disclosure; and FIG. 5 is a flow chart illustrating operations performed, such as by the apparatus of FIG. 2, in accordance with another example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in order to encourage a viewer to follow a storyline defined in a video, such as a large field of view video. In this regard, a storyline may be defined in any of a wide variety of different types of videos, but large field of view videos, such as those employed for virtual reality and other applications, may include a substantial quantity of video content such that a viewer may find it difficult to identify the portions of the video that are generally of the most interest or of significance in the absence of a storyline.

Terms 360-degree video or omnidirectional video may generally refer to video content that provides such a large field of view that only a part of the video is displayed at a single point of time by a typical display device. For example, omnidirectional video may be viewed on a head-mounted display (HMD) that may be capable of displaying, e.g., about 100-degree field of view (FOV). The spatial subset of the virtual reality video content to be displayed may be selected based on the orientation of the head-mounted display. In another example, a flat-panel viewing environment is assumed, wherein, e.g., up to 40-degree field-of-view may be displayed. When displaying wide field of view content (e.g. fisheye) on such a display, it may be preferred to display a spatial subset rather than the entire picture.

The use of the terms 360-degree video or omnidirectional video does not necessarily mean that the content covers the entire spherical field of view, but may for example cover 360-degree horizontal field-of-view but and less than 180-degree vertical field-of-view.

In 360-degree systems, a coordinate system may for example be defined through orthogonal coordinate axes X (lateral), Y (vertical, pointing upwards), and Z (back-to-front axis, pointing outwards) that may be used for defining yaw ($\phi$), pitch ($\theta$), and roll angles. Yaw may be defined to rotate around the Y axis, pitch around the X axis, and roll around the Z axis. Rotations may be defined to be extrinsic, that is, around the X, Y, and Z fixed reference axes. The angles may be defined to increase clockwise when looking from the origin towards the positive end of an axis.

Global coordinate axes may be defined as coordinate axes, e.g., according to the coordinate system as discussed above, that are associated with audio, video, and images representing the same acquisition position and intended to be rendered together. The origin of the global coordinate axes is usually the same as the center point of a device or rig used for omnidirectional audio/video acquisition as well as the position of the observer's head in the three-dimensional space in which the audio and video tracks are located. In the absence of the initial viewpoint metadata, the playback may be recommended to be started using the orientation (0, 0, 0) in (yaw, pitch, roll) relative to the global coordinate axes.

A storyline is defined to include different sequential areas of the video over time. In other words, the storyline is defined by a series of different areas of the video with the different areas occurring at different points in time throughout the video and being located at either the same position or, more typically, different positions throughout the video. By way of illustration of a storyline, FIG. 1 depicts the field of view 10 of a video. The video may be presented such that the entire field of view is displayed by a display device at one point in time. However, the field of view of the video is generally larger than the display presented by the display device 12 such that at least a portion of the field of view of the video is offscreen during the presentation of the video. For example, FIG. 1 depicts peripheral portions of the field of view of the video extending beyond and being offscreen relative to the display device at a particular point in time. While the portion of the video that is presented by the display device is generally centered within the field of view of the video in FIG. 1, the field of view of the video may be differently positioned relative to the display device, such as based upon the viewing direction of the viewer, such that a peripheral portion of the field of view is presented by the display device in other instances.

As shown by the solid outline in FIG. 1, the storyline may include a first area 14 of the video (designated 1) that occurs at a first time during the playback of the video with the portion of the video included within the first area being considered to be significant or of importance. Thereafter, at different sequential points in time during the playback of the video, namely, a second time, a third time, a fourth time, a fifth time, etc. the storyline includes a second area, a third area, a fourth area and a fifth area, respectively, designated 2, 3, 4 and 5, respectively, with the second, third, fourth and fifth areas including portions of the video that are of significance or of importance at the different, subsequent points in time. Thus, to follow the storyline, a viewer would initially view the first area of the video at a first time and then sequentially transfer their view to the second area, the third area, the fourth area and the fifth area at second, third, fourth and fifth times, respectively, during the playback of the video.

In an instance in which the viewer fails to transition their view to the next sequential area of the storyline defined throughout the video by the time associated with the next sequential area, the viewer will be determined not to be following the storyline. In order to encourage the viewer to follow the storyline and/or to provide additional time for the viewer to resume following of the storyline, the method, apparatus and computer program product of an example embodiment repeatedly replay a portion of the video in a loop in an instance in which the viewer is determined to no longer be following the storyline. As such, the viewer is reminded of the storyline, is made aware that the portion of the video currently being viewed is not a portion of the storyline at this point in time, and is provided additional time during which to resume following of the storyline.

The apparatus of an example embodiment may be embodied by a variety of computing devices, such as a virtual reality system, an augmented reality system, a video presentation system, an image processing system or the like. Regardless of the type of computing device that embodies the apparatus, the apparatus 20 of an example embodiment is depicted in FIG. 2 and includes or otherwise is associated with, processing circuitry 22 including, for example, a processor 24 and an associated memory 26, and optionally a display device 28 and/or a viewing direction tracking system 30.

In the processing circuitry 22, the processor 24 (and/or co-processors or any other circuitry assisting or otherwise associated with the processor) may be in communication with the memory device 26 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an encoder and/or a decoder) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 20 may include or otherwise be in communication with a display device 28 that may, in turn, be in communication with the processing circuitry 22 to cause presentation of the video content of the scene. As such, the display device may include, for example, a display, a touch screen, or other visual output mechanism. Alternatively or additionally, the processor 24 may comprise user interface circuitry configured to control at least some functions of the display device such as, for example, a display, and/or the like. The processor and/or user interface circuitry comprising the processor may be configured to control one or more functions of the display device through computer program instructions (e.g., software and/or firmware) stored on a memory accessible to the processor (e.g., memory device 26, and/or the like).

The apparatus 20 of an example embodiment may also include or otherwise be in communication with a viewing direction tracking system 30 in order to track the viewing direction of the viewer and, in turn, the point of regard within the field of view of the video that is the object of the viewer's attention. The viewing direction tracking system may be configured in various manners, but, in one embodiment, includes a gaze tracking system having one or more sensors to receive or collect information regarding the point of regard of the viewer and to convey the information to the processor 22 for determination of the location within the field of view that the viewer intends to view. The sensor may be one or more image sensors, e.g., cameras, for capturing respective images of one or more of a first eye of the viewer, a second eye of the same viewer and/or the field of view of the viewer. The sensor(s) in collaboration with the processor are configured to track eye movement and to estimate a point of regard of the viewer. Although a gaze tracking system may be embodied in various different manners, one example of a gaze tracking system is provided by U.S. patent application Ser. No. 14/918,962 entitled "Method, Apparatus, and Computer Program Product for Tracking Eye Gaze and Eye Movement" filed Oct. 21, 2015, the entire contents of which are incorporated herein in their entirety. Alternatively, the orientation of the viewer's head may be tracked based upon measurements provided by one or more accelerometers and/or gyroscopes then interpreted by the processor as an estimate of the viewing direction.

The operations performed, such as by the apparatus 20 of FIG. 2, in accordance with an example embodiment in order to encourage a viewer to follow a storyline defined throughout a video will now be described by way of example, but not of limitation, with respect to the flowchart of FIG. 3. As shown in block 40 of FIG. 3, the apparatus of an example embodiment includes means, such as the processing circuitry 22, the processor 24, the viewing direction tracking system 30 or the like, for monitoring viewing by a viewer of different sequential areas of a video over time. The different sequential areas of the video are associated with different points in time throughout the video and define a storyline. The different points in time may be defined, for example, by respective time values, such as measured from the beginning of the video, or in other manners, such as by the identification of particular frame(s) within the video. The location viewed by the viewer may be monitored in a variety of manners. For example, in conjunction with a virtual reality application, the viewer may wear a headset with the headset including the display device 28 in the form of a shield, visor or other display surface upon which the video is presented. In this example embodiment, the headset may include the viewing direction tracking system 30 or otherwise be in communication with the viewing direction tracking system in order to monitor the viewing direction of the viewer and the corresponding point of regard. By way of example, the viewing direction tracking system may include a gaze tracking system for monitoring the eyes of the viewer such that the viewing direction and the corresponding point of regard may be determined based upon the position and movement of the eyes of the viewer. Alternatively, the viewing direction tracking system may be embodied by one or more accelerometers and/or gyroscopes for determining head orientation from which the viewing direction may be estimated. Still further, in embodiments in which the video is presented upon a display device in the form of a display screen, such as upon a television set, a movie screen, the display screen of a personal computer, the touch screen of a tablet computer or the like, the viewer may provide inputs, such as via a user interface, e.g., via directional arrow keys, movement of a mouse or other cursor, interaction with a touch screen or the like, that provides directional information and defines the viewing direction of the viewer. In these embodiments, the viewing direction tracking system may be embodied by the user interface via which the viewer provides directional information indicating the portion of the field of view that the viewer desires to view. The processor 22 may be responsive to the directional information provided by the viewer in order to determine the manner in which the field of view is to be repositioned upon the display device.

The apparatus 20 also includes means, such as the processing device 22, the processor 24 or the like, for determining whether the storyline is being followed by the viewer, such as in an instance in which the viewer is determined to view each of the different sequential areas of the video that define the storyline at the respective points in time associated with the different sequential areas of the video. See block 42. In an instance in which the storyline is determined to be followed, the apparatus includes means, such as the processing device, the processor, the display device 28 or the like, for permitting the video to continue to be presented. See block 44 of FIG. 3. With respect to the example of a storyline depicted in FIG. 1 that includes five different sequential areas of video, the viewer would be determined to follow the storyline in an instance in which the viewing direction of the viewer coincides with the first area at the first time, the second area at the second time, the third area at the third time, the fourth area at the fourth time and the fifth area at the fifth time. In an instance in which the entire storyline is followed, the video is permitted to continue to be presented from the beginning to the end without interruption. In this regard, FIG. 4a depicts the uninterrupted presentation of a video 60 that has a duration of two minutes (2:00). In an instance in which the viewer follows the storyline from the beginning to the end, the video playback is uninterrupted and takes two minutes as shown in FIG. 4a.

However, in an instance in which in block 42 the storyline is not followed in that a next sequential area of the video in the storyline is determined not to be viewed, that is, not to be viewed at the point of time of the video associated with the next sequential area and at which the next sequential area is to be presented, the presentation of the video may be interrupted. As shown in block 46 of FIG. 3, for example, the apparatus 20 of this example embodiment includes means, such as the processing device 22, the processor 24, the display device 28 or the like, for causing the portion of the video prior to the next sequential area to be repeatedly replayed in a loop in an instance in which it is determined that the storyline is not followed as a result of the next sequential area of the video in the storyline not being viewed at or by the time associated with the next sequential area.

In this regard and in relation to causing the portion of the video prior to the next sequential area of the storyline to be replayed in a loop, the apparatus 20 of an example embodiment includes means, such as the processing device 22, the processor 24, the memory 26 or the like, for defining the length of the portion of the video that is repeatedly replayed in the loop based upon a predefined loop period. Although the predefined loop period may be provided in various manners, the video of one embodiment includes metadata associated therewith with one element of the metadata defining the predefined loop period. In an example embodiment, a multimedia container file may be associated with the video and may include metadata that defines the predefined loop period. In this regard, the metadata that defines the predefined loop period may be a timed metadata track, a sample group and/or sample auxiliary information within the multimedia container file. By way of example, the metadata may include samples or the like having a time span during which or a time by which a viewer is to have transitioned to the next sequential area within the field of view of the video, a location of the next sequential area within the field of view of the video and the predefined loop period. The predefined loop period may be the same for each sequential area of the storyline or the predefined loop periods of the different sequential areas of the storyline may differ.

The predefined loop period provided, for example, by the metadata associated with the video may, in turn, have been defined in various manners. For example, transition points may be defined throughout the video with each transition point associated with a respective area of the storyline. The transition point associated with a respective area identifies the time, such as a single point in time or a time period, within the video at which the viewer is to alter their viewing direction and correspondingly, their point of regard in order to view the next sequential area of the video. In this example, the predefined loop period may be defined to equal the minimum length of the video immediately preceding the transition point in which the scene movement repeats since that replay of the video loop of this length will appear relatively natural. In this regard, one example technique for defining a predefined loop period is described by U.S. patent application Ser. No. 15/664,847, entitled "Method and Apparatus for Encoding or Decoding Video Content Including Regions Having Looping Videos of Different Loop Lengths", filed on Jul. 31, 2017, the entire contents of which are incorporated herein by reference in their entirety.

In an example embodiment, the predefined loop period depends upon the portion of the video that the viewer was viewing immediately prior to the transition point. In this regard, some portions of the video immediately prior to the transition point may repeat more quickly and have a shorter predefined loop period, while other portions of the video immediately prior to the same transition point may repeat more slowly or less frequently and have a longer predefined loop period. Thus, reference herein to a predefined loop period for the video immediately preceding a transition point includes in at least some embodiments multiple predefined loop periods for the video immediately preceding a transition point with the different predefined loop periods associated with different portions of the video immediately preceding the transition point.

In an example embodiment, the storyline defines a respective transition point associated with each sequential area as described above. As such, the portion of the video that is repeatedly replayed in a loop is that portion of the video that immediately precedes the transition point and that has the defined length, such as the predefined loop period. Although the storyline may be defined in various manners, the metadata associated with a video may include the information that defines the storyline including the location of the different sequential areas throughout the video, as well as the respective transition points associated with each sequential area. The locations of the different sequential areas may be defined in various manners. In one embodiment, however, the location of an area of the storyline may be defined in terms of yaw, pitch and roll. For example, yaw and pitch values may be provided by the metadata associated with the video so as to indicate the center of the area, while a roll parameter may indicate the roll angle of the area or may be absent to indicate a zero roll angle or to indicate that any roll angle is allowed. Given the center of the area, the area may have a predefined size and shape about the defined center point, such as may be stored by memory 26. Alternatively, the size and shape of a respective area of the storyline may be defined by metadata associated with the video.

Although the video may be represented in various manners, one example of an embodiment of the present disclosure will hereinafter be provided in conjunction with video content that is formatted in accordance with the international standards organization (ISO) based media file format, namely ISO/IEC14496-12 (ISO base media file format (ISOBMFF)) and the file format for network abstraction layer (NAL) unit structured video, namely, ISO/IEC14496-15, which is derived from the ISOBMFF. A basic building block in the ISO base media file format is a box. Each box has a header and a payload. The box header indicates the type of box and the size of the box in terms of bytes. The box may include one or more other boxes and the ISO file format specifies which box types are allowed within a box of a predefined type. Furthermore, the presence of some boxes may be mandatory in each file, while the presence of other boxes may be optional. For some box types, it may be allowable to have more than one box present in a file. Thus, the ISO based media file format is considered to specify a hierarchical structure of boxes.

According to the ISO family of file formats including ISOBMFF and the file format for NAL unit structured video, a file includes media data, such as the video content of a scene, and metadata that is encapsulated into boxes. Each box is identified by a four character code (4CC) and starts with a header that indicates the type and size of the box. In files conforming to ISOBMFF, the data, such as the video content of the scene, e.g., encoded video content, may be provided in a media data (mdat) box and the metadata may be provided in a movie (moov) box. In some instances, for a file to be operable, both of the mdat and moov boxes may be required. The moov box may include one or more tracks with each track residing in a corresponding track (trak) box. A track may be one of many types including a media track that refers to samples formatted according to a media compression format (and its encapsulation to the ISOBMFF).

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derives from generic classes (e.g. VisualSampleEntry, AudioSampleEntry). In regards to the type of sample entry form to be used for derivation, the track-type specific sample entry format is determined by the media handler of the track.

The ISO Base Media File Format contains three mechanisms for timed metadata that can be associated with particular samples: sample groups, timed metadata tracks, and sample auxiliary information. Derived specification may provide similar functionality with one or more of these three mechanisms.

Samples of timed metadata tracks describe or provide metadata for associated samples in media tracks. A timed metadata track is associated with media tracks using track references, which have a four-character code describing the type of the association. Samples of timed metadata track may be associated with samples of the referenced media track(s) using, for example, decoding or presentation time. For example, a sample in a timed metadata track that is aligned in decoding time with a sample in a media track may be associated with the media sample.

A sample grouping in the ISO base media file format and its derivatives may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping type parameter field that can be used, e.g., to indicate a sub-type of the grouping.

In conjunction with ISOBMFF, the Moving Picture Experts Group (MPEG) is defining an omnidirectional media format (OMAF) that serves as a media application format that enables omnidirectional media applications, such as 360° video and associated audio. OMAF firstly specifies a list of projection methods that can be used for conversion of a spherical video into a two-dimensional rectangular video, followed by directions as to how to store omnidirectional media and the associated metadata using ISOBMFF and directions as to encapsulating, signaling and streaming omnidirectional media in a media streaming system, e.g., dynamic adaptive streaming over hypertext transfer protocol (HTTP) (DASH), and finally information as to which video and audio codecs as well as media coding configurations can be used for compression and playback of the omnidirectional media signal.

A sphere region may be defined as a region on a sphere, which may be further constrained by the means to specify the sphere region, which may include but might not be limited to specifying the region either by four great circles or by two yaw circles and two pitch circles. A great circle may be defined as an intersection of the sphere and a plane that passes through the center point of the sphere. A great circle is also known as an orthodrome or Riemannian circle. The center of the sphere and the center of a great circle are co-located. A pitch circle may be defined as a circle on the sphere connecting all points with the same pitch value. A yaw circle may be defined as a circle on the sphere connecting all points with the same yaw value. A sphere region may further require a point within the region, such as the center point of the region, to make it distinct from another sphere region that would otherwise be defined with the same parameters (e.g., the same great circles).

OMAF specifies timed metadata for sphere regions. The purpose for sphere region timed metadata track is indicated by the sample entry type. The sample format of all metadata tracks specified in OMAF starts with a common part and may be followed by an extension part that is specific to the sample entry of the metadata track. Each sample of sphere region timed metadata specifies a sphere region.

The sample entry of OMAF sphere region timed metadata may define the shape type of the sphere regions contained in the track, such as discussed above. The sample entry of sphere region timed metadata may also indicate if the size of the sphere regions are constant over time, and, if so, define the extents of the sphere regions.

A syntax structure, which may be referred to as SphereRegionStruct, may indicate the location of the sphere region, the rotation angle of the sphere region (e.g. around the axis that intersects the center of the coordinate system and the center of the sphere region), and/or the extents of the sphere region. The sample format of OMAF sphere region timed metadata may be referred to as SphereRegionSample and may comprise one or more SphereRegionStruct syntax structures.

In conjunction with the metadata associated with the video including the locations of the sequential areas that define the storyline, the video and the associated metadata of one example embodiment may be provided in accordance with MPEG OMAF. In this regard, the metadata defines the location of each sequential area that defines the storyline, the transition point at which the viewer is to shift their viewing direction and correspondingly their point of regard to the next sequential area of the storyline and the predefined loop period of the looping video that may be replayed if the storyline is not followed. In this example embodiment, the sample entry type for the metadata track that includes this metadata may be 'copp', while the sample syntax of the metadata track may be:

```
class ConditionalPresentationProgressSample( ) extends
SphereRegionSample {
    unsigned int(32) loop_period;
}
```

In the pseudo-code, the keyword "extends" specifies that the defined syntax structure appends, that is, adds syntax elements to the end of, the referred syntax structure. Thus, the syntax elements of SphereRegionSample are included in the sample. These syntax elements may include center_yaw, center_pitch, and center_roll which serve to specify the respective sequential area of the storyline, such as in units of $2^{-16}$ degrees relative to the global coordinate axes. In this regard, center_yaw and center_pitch indicate the center of the area, and center_roll indicates the roll angle of the area. In some embodiments, center_roll may be ignored. The sphere region included in ConditionalPresentationProgress-Sample defines the area required to be viewed (e.g., within the displayed viewport and/or covering gaze direction) in order to progress the playback of the video. The decoding time or presentation time, also known as the composition time, of the ConditionalPresentationProgressSample may define the period during which the area ought to be viewed in order to progress the playback of the video. In some embodiments, loop_period is allowed to be 0 to indicate pausing of the video until the defined sphere region is viewed.

Additionally, loop_period specifies the predefined loop period. In one embodiment described above, multiple loop_periods having different predefined loop periods may be provided for different portons of the video immediately prior to the transition point. In this regard, lastTime may serve as the transition point such that if the viewer does not shift their viewing direction and correspondingly their point of regard to the next sequential area of the storyline by the lastTime, a portion of the video will be replayed beginning at lastTime—loop_period. In one embodiment, the frames of the video that are time-aligned with lastTime—loop_period in composition time may be required to be either sync samples or stream access points of type 1 to 3, inclusive, indicated by the SAP sample group of the video. Such a requirement enables decoding the video starting from the position (lastTime—loop_period). However, if the viewer does shift their viewing direction and correspondingly their point of regard to the next sequential area of the storyline by the lastTime, the presentation of the video progresses beyond lastTime.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may only happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

Several types of SAP have been specified, including the following types. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

A stream access point (SAP) sample group as specified in ISOBMFF identifies samples as being of the indicated SAP type. The grouping_type_parameter for the SAP sample group comprises the fields target_layers and layer_id_method_idc. target_layers specifies the target layers for the indicated SAPs. The semantics of target_layers may depend on the value of layer_id_method_idc. layer id method idc specifies the semantics of target_layers. layer_id_method_idc equal to 0 specifies that the target layers consist of all the layers represented by the track. The sample group description entry for the SAP sample group comprises the fields dependent_flag and SAP_type. dependent_flag may be required to be 0 for non-layered media. A dependent_flag equal to 1 specifies that the reference layers, if any, for predicting the target layers may have to be decoded for accessing a sample of this sample group. A dependent_flag equal to 0 specifies that the reference layers, if any, for predicting the target layers need not be decoded for accessing any SAP of this sample group. sap_type values in the range of 1 to 6, inclusive, specify the SAP type, of the associated samples.

Sync samples in ISOBMFF may be considered equivalent to SAP type 1. A file writer may indicate sync samples, for example, with a SyncSampleBox, and a file reader may conclude sync samples, for example, by parsing SyncSampleBox.

In an embodiment, more than one region applying simultaneously may be defined. When any of these regions is viewed, the playback of the video is progressed. When none of these regions is viewed, a portion of the video is repeated. Multiple regions can be enabled for example in the presented OMAF-based example above by allowing the samples to comprise more than one sphere region, which may be enabled by setting the value of num_regions syntax element in the sample entry to a value greater than 1.

In an embodiment, timed metadata may be defined to comprise regions that cause video to be looped (and not to be progressed until a region outside the defined regions is watched). When none of these regions is viewed, the playback of the video is progressed. When any of these regions is viewed, a portion of the video is repeated. In an embodiment, the loop period could be different depending on the direction or region the user is viewing. Depending on the video content different areas have different optimal looping periods, and hence this embodiment enables more pleasant looped playback. The sample format in an OMAF-based example may be the following:

```
class ConditionalPresentationLoopSample( ) extends SphereRegionSample
{
    for (i = 0; i < num_regions; i++)
        unsigned int(32) loop_period;
}
```

Each loop_period value defines the loop period for the respective sphere region defined earlier in the same ConditionalPresentationLoopSample.

Returning now to FIG. 3 and, in particular, to decision block 48, the apparatus 20 of this example embodiment also includes means, such as the processing device 22, the processor 24, the viewing direction tracking system 30 or the like, for determining when the viewer resumes following of the storyline, such as by changing the viewing direction and corresponding point of regard to coincide with the next sequential area of the storyline. If the viewer does not resume following of the storyline, the looping video continues to be presented, either until the viewer resumes following of the storyline or for a predefined period of time, after which the playback of the video is ceased. In the instance in which the viewer is determined to have resumed following of the storyline, however, the apparatus includes means, such as the processing circuitry, the processor, the display device 28 or the like, for causing the repeated replay of the portion of the video to cease and the presentation of the video to resume, such as from the transition point associated with the next sequential area of the storyline, in an instance in which the storyline is followed and the next sequential area of the storyline in the video is determined to be viewed. See blocks 50 and 52 of FIG. 3. In this regard, the apparatus, such as the processing device, the processor, the display device or the like, may cause the portion of the video prior to the next sequential area to be repeatedly replayed in a loop as shown in block 46 until the storyline is again followed and the next sequential area of the video in the storyline is determined to be viewed, at which point in time the repeatedly replayed video loop will cease and the presentation of the video will resume.

As an example and as shown in FIG. 4b, the same video of a duration of two minutes that was described above in conjunction with FIG. 4a is presented beginning at time 0:00. In this example, the viewer follows the storyline of the video 60a until time 1:30. At time 1:30, coinciding with a transition point in the video to the next sequential area of the storyline, the viewer is determined to no longer be following the storyline by failing to shift their viewing direction and correspondingly their point of regard so as to coincide with the next sequential area of the video. As such, the portion of the video preceding the next sequential area is repeatedly replayed in a loop 62 beginning at time 1:30. After 20 seconds, that is, at time 1:50, the viewer is determined to have changed their viewing direction and correspondingly their point of regard so as to now coincide with the next sequential area of the storyline, thereby resuming following of the storyline. As such, the repeated replay of the looping video is ceased and the presentation of the video 60b is recommenced at time 1:50 beginning at the transition point associated with the next sequential area. In this example, the viewer then continues to follow the storyline until the conclusion of the video at time 2:20. Thus, the presentation of the video is interrupted for 20 seconds as a result of the viewer failing to follow the storyline, but the video is completed once the viewer resumes following of the storyline.

In one embodiment, the apparatus 20, such as the processing device 22, the processor 24, the display device 28 or the like, is configured to immediately resume presentation of the video beginning at the respective transition point associated with the next sequential area upon determining that the viewer has again begun to follow the storyline. In this example embodiment, upon determining that the viewer has again begun to follow the storyline, the presentation of the video would resume commencing with the respective transition point associated with the next sequential area regardless of the location within the video loop that is being repeatedly replayed. Thus, if it were determined that the viewer had resumed following of the storyline while an initial or intermediate portion of the looping video was being presented, the remainder of the looping video would not be presented and, instead, the presentation of the video beginning at the respective transition point associated with the next sequential area of the storyline would commence. In an alternative embodiment, however, upon detecting that a viewer has resumed following of the storyline, the looping video is completed, that is, the current loop or instance of the repeating video is presented until its conclusion. At the conclusion of the looping video, the video that is repeatedly replayed is not repeated but, instead, the presentation of the video is resumed beginning at the respective transition point associated with the next sequential area of the storyline. Thus, in this example embodiment, the transition brought about by the resumption in the presentation of the video may appear more natural as a result of the completion of the video loop prior to resumption in the presentation of video.

In another embodiment depicted in FIG. 5, a determination is made in an instance in which the storyline is not being followed by the viewer as to whether the portion of the video immediately preceding the next sequential area of the storyline is static with no change in the scene or experiences scene movement and, as a result, is not static. In this regard, a static portion of the video is one that does not contain moving objects, that is, the scene imaged by the video for the area does not contain any objects that move. Depending upon this determination, a looping video may be presented in an instance in which the portion of the video immediately preceding the next sequential area of the storyline experiences scene movement, but a static image, such as the image of a static frame of the video, is presented in an instance in which the portion of the video immediately preceding the next sequential area of the storyline is static.

In this example embodiment and as described above in conjunction with block 40 of FIG. 3, the apparatus 20 includes means, such as the processing circuitry 22, the processor 24, the viewing direction tracking system 30 or the like, for monitoring viewing by the viewer of different sequential areas of the video over time. See block 70 of FIG. 5. In an instance in which a determination is made that the storyline is followed, the apparatus includes means, such as the processing circuitry, the processor, the display device 28 or the like for permitting the video to continue to be presented. See blocks 72 and 74 of FIG. 5 as well as the foregoing discussion in conjunction with blocks 42 and 44 of FIG. 3. However, in an instance in which the storyline is not followed, the apparatus of this example embodiment includes means, such as the processing circuitry, the processor, the display device or the like, for determining whether the portion of the video prior to the next sequential area is static with no scene movement. See block 76 of FIG. 5. The location within the field of view of the video that is analyzed to determine whether the video is static is that location within the field of view of the video that is currently being viewed by the viewer. Additionally, the portion of the video that is analyzed for purposes of determining whether the video is static may be a predefined temporal period of the video prior to the respective transition point associated with the next sequential area. This predefined temporal period may be equal to the predefined loop period or may be some other predefined time period in which it is determined as to whether the portion of the video is static or if it experiences scene movement.

In an instance in which the portion of the video prior to the next sequential area is determined to be static, that is, to experience no scene movement, the apparatus 20 of this example embodiment includes means, such as the processing circuitry 22, the processor 24, the display device 28 or the like, for causing a frame of the video prior to the next sequential area to be repeatedly presented. See block 78 of FIG. 5. In this regard, the frame of the video that is repeatedly presented may be the frame of the video that immediately precedes the respective transition point associated with the next sequential area or the frame that coincides with the respective transition point associated with the next sequential area. In relation to an embodiment in which the video and the associated metadata are provided in accordance with MPEG OMAF, loop period may be set equal to 0, thereby causing video playback to be paused in order to present a static frame until the viewer views the next sequential area. However, in an instance in which the portion of the video prior to the next sequential area of the storyline is not static, but, instead, includes scene movement so as to vary over time, the apparatus includes means, such as the processing circuitry, the processor, the display device or the like, for causing the portion of the video prior to the next sequential area to be repeatedly replayed in a loop, thereby repeatedly presenting the scene movement from that portion of the video. See block 86 of FIG. 5.

While repeatedly presenting the static frame of the video as indicated at block 78 or repeatedly replaying the video loop as indicated at block 86, the apparatus 20 of this example embodiment includes means, such as the processing circuitry 22, the processor 24, the viewing direction tracking system 30 or the like, for determining an instance in which the viewer resumes following of the storyline, such as by redirection of the viewing direction and correspondingly the point of regard of the viewer so as to coincide with the next sequential area of the storyline. See blocks 80 and 88 of FIG. 5. If the viewer does not resume following of the storyline, either the static frame or the looping video continues to be presented, either until the viewer resumes following of the storyline or for a predefined period of time, after which the playback of the video is ceased. In an instance in which the viewer resumes following of the storyline, however, the apparatus of this example embodiment includes means, such as the processing circuitry, the processor, the display device 28 or the like, for ceasing the repeated presentation of the static frame as shown in block 82 of FIG. 5 or by ceasing the repeated replay of the video loop as shown in block 90 of FIG. 5. Further, the apparatus of this example embodiment includes means, such as the processing circuitry, the processor, the display device or the like, for causing presentation of the video to resume, such as by recommencing presentation of the video beginning at the respective transition point associated with the next sequential area of the storyline. See block 84.

As such, the method, apparatus 20 and computer program product of an example embodiment alert a viewer that the viewer is no longer following the storyline. However, the method, apparatus and computer program product of an example embodiment provide such information to the viewer in a manner that is not obtrusive and that permits the viewer to have the freedom to explore different portions of the video and to repeatedly view different portions of the video. However, upon resumption of the viewer's following of the storyline, the presentation of the video is seamlessly resumed, thereby enhancing the viewer experience.

As described above, FIGS. 3 and 5 illustrate flowcharts of an apparatus 20, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   determining a viewing direction of a video over time, wherein the video comprises a storyline that defines a series of different areas of the video at different points in time throughout the video;
   in an instance in which the storyline is followed based upon a transition of the viewing direction through the series of different areas of the video at the different points in time throughout the video, permitting the video to continue to be presented;
   in an instance in which the storyline is not followed and in which the portion of the video prior to a next sequential area of the video in the storyline is not static but varies over time, automatically causing a portion of the video immediately prior to the next sequential area to be repeatedly replayed in a loop, wherein the storyline defines a respective transition point associated with each sequential area, wherein the portion of the video that is repeatedly replayed in the loop comprises the portion of the video that immediately precedes the transition point associated with the next sequential area, and wherein automatically causing the portion of the video immediately prior to the next sequential area to be repeatedly replayed in a loop comprises defining a length of the portion of the video that is repeatedly replayed in the loop based upon a predefined loop period provided by metadata associated with the video; and
   following repeated replay of the portion of the video, automatically causing the repeated replay of the portion of the video to cease and presentation of the video to resume in an instance in which the viewing direction indicates that the storyline is followed during replay of the loop and the next sequential area of the video in the storyline is determined to be viewed as a result of a transition of the viewing direction to the next sequential area.

2. The method of claim 1, wherein automatically causing the portion of the video prior to the next sequential area to be repeatedly replayed in a loop comprises automatically causing the portion of the video prior to the next sequential area to be repeatedly replayed in a loop until the storyline is followed and the next sequential area of the video in the storyline is determined to be viewed.

3. The method of claim 1, wherein the video has a field of view that extends beyond a display device upon which the video is presented.

4. The method of claim 1, wherein the portion of the video replayed in the loop is defined as a plurality of video frames between a beginning of a current sequential area and a next sequential area of the video in the instance in which the storyline is not followed.

5. The method of claim 4, wherein a yaw, a pitch, and a roll of viewing by a viewer can be changed while causing the portion of the video prior to the next sequential area to be repeatedly replayed in a loop.

6. The method of claim 1, wherein in the instance in which the storyline is not followed in that the next sequential area of the video in the storyline is determined not to be viewed, causing the portion of the video prior to the next sequential area to be repeatedly replayed in a loop comprises:
   in the instance in which the storyline is not followed for longer than a duration of the portion of the video during which the next sequential area of the video in the storyline is determined not to be viewed, causing the portion of the video prior to the next sequential area to be repeatedly replayed in a loop.

7. The method of claim 1, wherein causing repeated replay of the portion of the video to cease and presentation of the video to resume comprises:
   causing the repeated replay of the portion of the video to cease and presentation of the video to resume only after a final replay of the portion of the video following the instance in which the storyline is followed.

8. An apparatus comprising:
   at least one processor and
   at least one memory including computer program code, the at least one memory and computer program code configured to, with the processor, cause the apparatus to at least:
   determine a viewing direction of a video over time, wherein the video comprises a storyline that defines a series of different areas of the video at different points in time throughout the video;
   in an instance in which the storyline is followed based upon a transition of the viewing direction through the series of different areas of the video at the different points in time throughout the video, permit the video to continue to be presented;
   in an instance in which the storyline is not followed and in which the portion of the video prior to a next sequential area of the video in the storyline is not static but varies over time, automatically cause a portion of the video immediately prior to the next sequential area to be repeatedly replayed in a loop, wherein the storyline defines a respective transition point associated with each sequential area, and wherein the portion of the video that is repeatedly replayed in the loop comprises the portion of the video that immediately precedes the transition point associated with the next sequential area; and
   following repeated replay of the portion of the video, automatically cause the repeated replay of the portion of the video to cease and presentation of the video to resume in an instance in which the viewing direction indicates that the storyline is followed during replay of the loop and the next sequential area of the video in the storyline is determined to be viewed as a result of a transition of the viewing direction to the next sequential area,
   wherein the at least one memory and computer program code are configured to, with the processor, cause the apparatus to automatically cause the portion of the video immediately prior to the next sequential area to be repeatedly replayed in a loop by defining a length of the portion of the video that is repeatedly replayed in the loop based upon a predefined loop period provided by metadata associated with the video.

9. The apparatus of claim 8, wherein the at least one memory and computer program code are configured to, with the processor, cause the apparatus to automatically cause the portion of the video prior to the next sequential area to be repeatedly replayed in a loop by causing the portion of the video prior to the next sequential area to be repeatedly replayed in a loop until the storyline is followed and the next sequential area of the video in the storyline is determined to be viewed.

10. The apparatus of claim 8, wherein the video has a field of view that extends beyond a display device upon which the video is presented.

11. A computer program product comprising a non-transitory computer readable storage medium, the non-transitory computer readable storage medium comprising instructions that, when executed, are configured to cause:
   determining a viewing direction of a video over time, wherein the video comprises a storyline that defines a series of different areas of the video at different points in time throughout the video;
   in an instance in which the storyline is followed based upon a transition of the viewing direction through the series of different areas of the video at the different points in time throughout the video, permitting the video to continue to be presented;
   in an instance in which the storyline is not followed and in which the portion of the video prior to a next sequential area of the video in the storyline is not static but varies over time, automatically causing a portion of the video immediately prior to the next sequential area to be repeatedly replayed in a loop, wherein the storyline defines a respective transition point associated with each sequential area, and wherein the portion of the video that is repeatedly replayed in the loop comprises the portion of the video that immediately precedes the transition point associated with the next sequential area; and
   following repeated replay of the portion of the video, automatically causing the repeated replay of the portion of the video to cease and presentation of the video to resume in an instance in which the viewing direction indicates that the storyline is followed during replay of the loop and the next sequential area of the video in the storyline is determined to be viewed as a result of a transition of the viewing direction to the next sequential area,
   wherein the instructions configured to automatically cause the portion of the video immediately prior to the next sequential area to be repeatedly replayed in a loop comprise instructions configured to define a length of the portion of the video that is repeatedly replayed in the loop based upon a predefined loop period provided by metadata associated with the video.

12. The computer program product of claim 11, wherein the instructions that, when executed, are configured to automatically cause the portion of the video prior to the next sequential area to be repeatedly replayed in a loop comprise instructions that, when executed, are configured to automatically cause the portion of the video prior to the next sequential area to be repeatedly replayed in a loop until the storyline is followed and the next sequential area of the video in the storyline is determined to be viewed.

13. A method comprising:
   determining a viewing direction of a video over time, wherein the video comprises a storyline that defines a series of different areas of the video at different points in time throughout the video;
   in an instance in which the storyline is followed based upon a transition of the viewing direction through the series of different areas of the video at the different points in time throughout the video, permitting the video to continue to be presented;
   in an instance in which the storyline is not followed and in which the portion of the video prior to a next sequential area of the video in the storyline is not static but varies over time, automatically causing a portion of the video immediately prior to the next sequential area to be repeatedly replayed in a loop, wherein the storyline defines a respective transition point associated with each sequential area, wherein the portion of the video that is repeatedly replayed in the loop comprises the portion of the video that immediately precedes the transition point associated with the next sequential area, and wherein automatically causing the portion of the video immediately prior to the next sequential area to be repeatedly replayed in a loop comprises defining a length of the portion of the video that is repeatedly replayed in the loop based upon a length of the video immediately preceding the transition point in which scene movement repeats; and
   following repeated replay of the portion of the video, automatically causing the repeated replay of the portion of the video to cease and presentation of the video to resume in an instance in which the viewing direction indicates that the storyline is followed during replay of the loop and the next sequential area of the video in the storyline is determined to be viewed as a result of a transition of the viewing direction to the next sequential area.

14. The method of claim 13, wherein the video has a field of view that extends beyond a display device upon which the video is presented.

15. An apparatus comprising:
   at least one processor and
   at least one memory including computer program code, the at least one memory and computer program code configured to, with the processor, cause the apparatus to at least:
   determine a viewing direction of a video over time, wherein the video comprises a storyline that defines a series of different areas of the video at different points in time throughout the video;
   in an instance in which the storyline is followed based upon a transition of the viewing direction through the series of different areas of the video at the different points in time throughout the video, permit the video to continue to be presented;
   in an instance in which the storyline is not followed and in which the portion of the video prior to a next sequential area of the video in the storyline is not static but varies over time, automatically cause a portion of the video immediately prior to the next sequential area to be repeatedly replayed in a loop, wherein the storyline defines a respective transition point associated with each sequential area, and wherein the portion of the video that is repeatedly replayed in the loop comprises the portion of the video that immediately precedes the transition point associated with the next sequential area; and
   following repeated replay of the portion of the video, automatically cause the repeated replay of the portion of the video to cease and presentation of the video to resume in an instance in which the viewing direction indicates that the storyline is followed during replay of the loop and the next sequential area of the video in the storyline is determined to be viewed as a result of a transition of the viewing direction to the next sequential area, wherein the at least one memory and computer program code are configured to, with the processor, cause the apparatus to automatically cause the portion of the video immediately prior to the next sequential area to be repeatedly replayed in a loop by defining a length of the portion of the video that is repeatedly replayed in the loop based upon a length of the video immediately preceding the transition point in which scene movement repeats.

16. The apparatus of claim 15, wherein the video has a field of view that extends beyond a display device upon which the video is presented.

17. A computer program product comprising a non-transitory computer readable storage medium, the non-transitory computer readable storage medium comprising instructions that, when executed, are configured to cause:

determining a viewing direction of a video over time, wherein the video comprises a storyline that defines a series of different areas of the video at different points in time throughout the video;

in an instance in which the storyline is followed based upon a transition of the viewing direction through the series of different areas of the video at the different points in time throughout the video, permitting the video to continue to be presented;

in an instance in which the storyline is not followed and in which the portion of the video prior to a next sequential area of the video in the storyline is not static but varies over time, automatically causing a portion of the video immediately prior to the next sequential area to be repeatedly replayed in a loop, wherein the storyline defines a respective transition point associated with each sequential area, wherein the portion of the video that is repeatedly replayed in the loop comprises the portion of the video that immediately precedes the transition point associated with the next sequential area, and wherein automatically causing the portion of the video immediately prior to the next sequential area to be repeatedly replayed in a loop comprises defining a length of the portion of the video that is repeatedly replayed in the loop based upon a length of the video immediately preceding the transition point in which scene movement repeats; and following repeated replay of the portion of the video, automatically causing the repeated replay of the portion of the video to cease and presentation of the video to resume in an instance in which the viewing direction indicates that the storyline is followed during replay of the loop and the next sequential area of the video in the storyline is determined to be viewed as a result of a transition of the viewing direction to the next sequential area.

18. The computer program product of claim 17, wherein the video has a field of view that extends beyond a display device upon which the video is presented.

* * * * *